United States Patent
Rosca et al.

(10) Patent No.: US 8,326,465 B2
(45) Date of Patent: Dec. 4, 2012

(54) WIRELESS BUILDING MANAGEMENT SYSTEM AND METHOD USING A BUILDING MODEL

(75) Inventors: Justinian Rosca, West Windsor, NJ (US); Osman Ahmed, Hawthorn Woods, IL (US); Chellury R. Sastry, Richardson, NJ (US); Richard John LeBlanc, Libertyville, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 448 days.

(21) Appl. No.: 12/553,802

(22) Filed: Sep. 3, 2009

(65) Prior Publication Data

US 2010/0114383 A1 May 6, 2010

Related U.S. Application Data

(60) Provisional application No. 61/093,816, filed on Sep. 3, 2008.

(51) Int. Cl.
*G06F 19/00* (2011.01)
(52) U.S. Cl. .......................... 700/276; 703/6
(58) Field of Classification Search .............. 455/433, 455/410, 450, 446; 340/521, 531, 539.22; 700/275, 276, 299; 703/1, 6
See application file for complete search history.

(56) References Cited

U.S. PATENT DOCUMENTS

| | | | |
|---|---|---|---|
| 6,922,558 B2 * | 7/2005 | Delp et al. ................. 455/420 |
| 6,944,622 B1 * | 9/2005 | Mitchell et al. ................. 1/1 |
| 6,971,063 B1 * | 11/2005 | Rappaport et al. ............ 715/733 |
| 7,010,594 B2 * | 3/2006 | Defosse ................. 709/224 |
| 7,455,225 B1 * | 11/2008 | Hadfield et al. ............... 235/384 |
| 2004/0236547 A1 * | 11/2004 | Rappaport et al. ................ 703/2 |
| 2006/0202834 A1 | 9/2006 | Moriwaki |
| 2008/0277486 A1 * | 11/2008 | Seem et al. ................. 236/49.3 |
| 2009/0043911 A1 * | 2/2009 | Flammer et al. ............. 709/238 |

OTHER PUBLICATIONS

PCT Search Report dated Jan. 22, 2010.

* cited by examiner

*Primary Examiner* — Kidest Bahta

(57) ABSTRACT

A building system includes a communication network, a plurality of wireless nodes, a plurality of passive wireless devices, a plurality of sensors, and a processing circuit. The wireless nodes are disposed within a building and are operably coupled to the communication network. Each passive wireless device is affixed to an object within the building, and contains first information regarding at least one property of the object. Each the passive wireless device is configured to communicate wirelessly to the wireless nodes using power derived from communication signals detected in the passive wireless device. The sensors are configured to generate second information representative of sensed temperature throughout the building, each sensor operably connected to the communication network. The processing circuit is operably coupled to receive the first information from the wireless devices and the second information from the sensors. The processing circuit is configured to generate control information regarding the building based on the first information and the second information.

18 Claims, 9 Drawing Sheets

WIRELESS BUILDING MANAGEMENT SYSTEM AND METHOD USING A BUILDING MODEL

This application claims the benefit of U.S. Provisional Patent Application Ser. No. 61/093,816, filed Sep. 3, 2008, and which is incorporated herein by reference.

FIELD OF THE INVENTION

The present invention relates to building systems, building data modeling, and building automation.

BACKGROUND OF THE INVENTION

Building information modeling has been employed to assist in planning and implementation of various building systems. For example, it is known to provide building models during the development stage of a building project to aid in the selection of equipment, and to assist in formulating a construction plan. A building model will often contain granular details about the structural elements of a building, such as framing details, foundation details, wall details and the like.

Existing building information models contain data identifying the two-dimensional or three-dimensional interrelationships among elements. Building models are typically stored as databases, and can be used by third parties for many purposes. While basic building construction can be planned and implemented using the building model, the building model can have additional purposes, such as for use in thermal load simulation analysis, or electrical power load simulation analysis.

As construction progresses, further detail regarding the building becomes available, and in some cases, variations from the model occur. For example, during the construction process, equipment is selected, and details regarding ventilation, heating, plumbing, electrical and other elements are identified. The building model can be enhanced based on these additional details, providing a more comprehensive and accurate model.

Historically, maintenance of the building model becomes more difficult and time-consuming as the building process progresses. Because the actual construction involves several subcontractors, each with several employees, it is difficult to update the building model in a comprehensive and reliable manner. As a result, the building model is often somewhat obsolete and has limited utility and reliability once the building has been constructed and is in use.

As a result, the operation of the systems in the normal activities of a building typically occurs without the benefit of an accurate and granular building model. However, it is known that an accurate building model can provide for analysis and simulation of various systems in an effort to optimize building operation. Nevertheless, because accurate building models for completed and occupied buildings are not readily attainable, optimization is typically attempted through trial and error.

Accordingly, there is a need for a better method of establishing and/or maintaining a building model, preferably as a database. Such a building model can provide multiple advantages during the operation of a building.

SUMMARY OF THE INVENTION

At least some embodiments of the present invention address the above need, as well as others, by providing an system and method for automatically building and/or updating a building data model. At least some embodiments implement new elements into the model that can be used by various applications including simulation, building control, space planning, and the like.

A first embodiment is a building system that includes a communication network, a plurality of wireless nodes, a plurality of passive wireless devices, a plurality of sensors, and a processing circuit. The wireless nodes are disposed within a building and are operably coupled to the communication network. Each passive wireless device is affixed to an object within the building, and contains first information regarding at least one property of the object. Each the passive wireless device is configured to communicate wirelessly to the wireless nodes using power derived from communication signals detected in the passive wireless device. The sensors are configured to generate second information representative of sensed temperature throughout the building, each sensor operably connected to the communication network. The processing circuit is operably coupled to receive the first information from the wireless devices and the second information from the sensors. The processing circuit is configured to generate control information regarding the building based on the first information and the second information.

The above described features and advantages, as well as others, will become more readily apparent to those of ordinary skill in the art by reference to the following detailed description and accompanying drawings.

DETAILED DESCRIPTION

Figure 1:
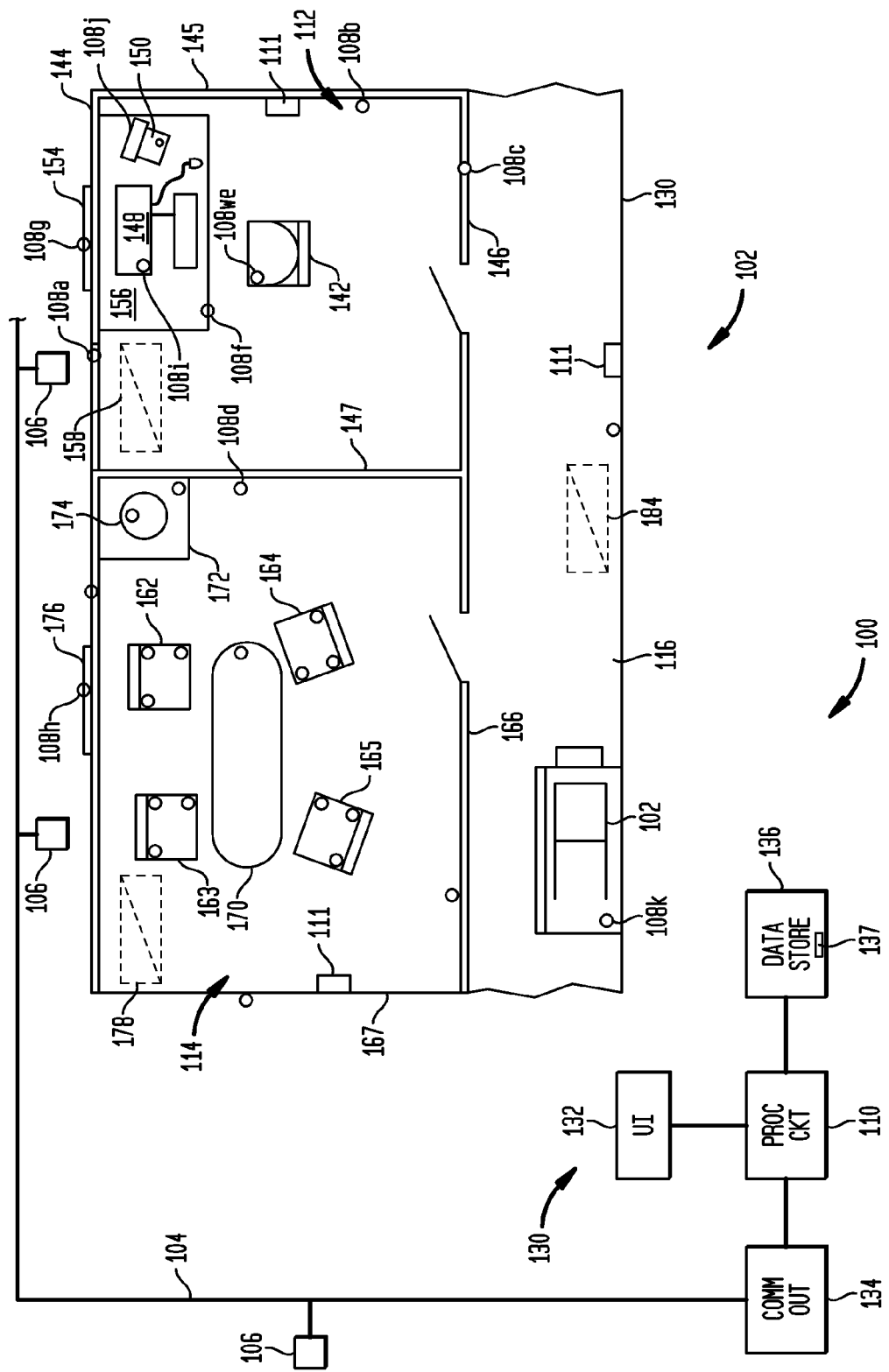
FIG. 1 shows an exemplary embodiment of building system according to the invention in a portion or area of a building.
Figure 2:
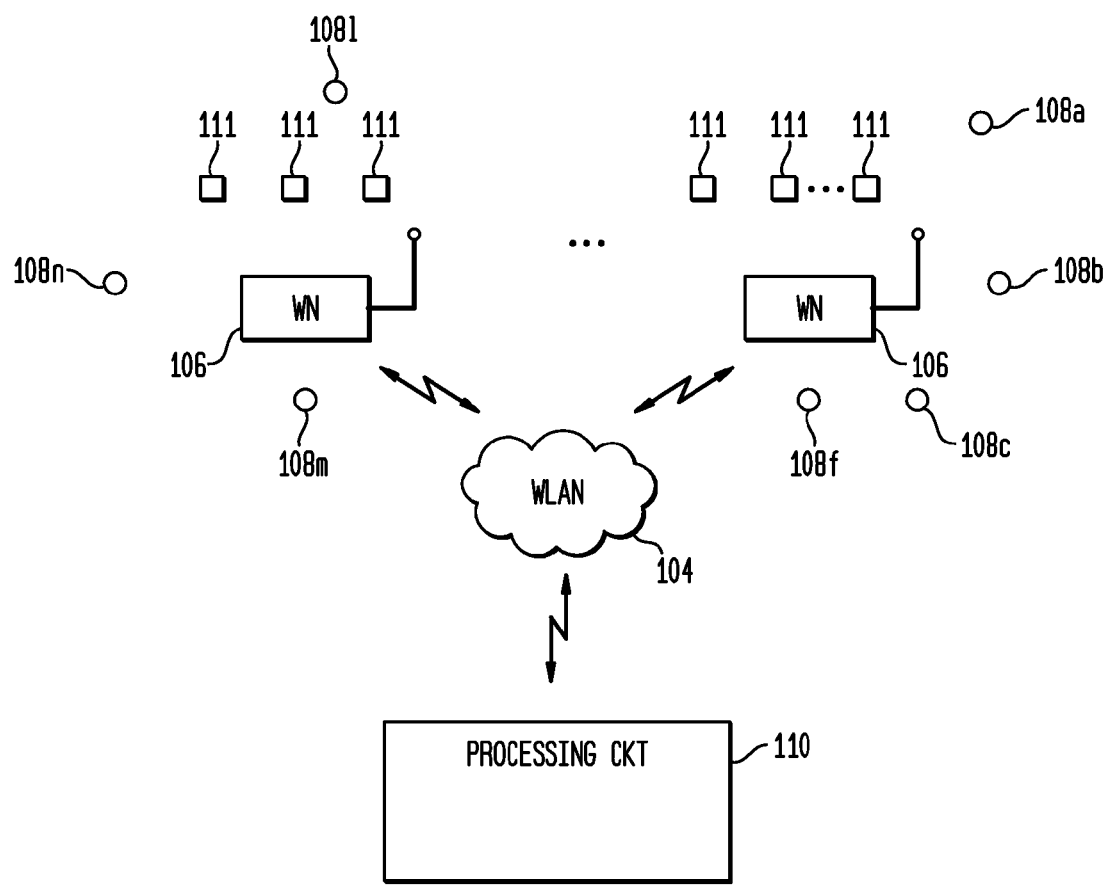
FIG. 2 shows a schematic block diagram of the building system 100 of FIG. 1 apart from the building.

FIGS. 1 and 2 show an exemplary embodiment of an embodiment of the invention implemented in a portion of a building. More specifically, FIG. 1 shows a building system 100 in a portion or area 102 of a building that includes a communication network 104, a plurality of wireless nodes 106 within a building operably coupled to the communication network 104, a plurality of passive wireless devices 108a, 108b, . . . 108n, and a processing circuit 110. In this embodiment, the building system 100 also includes sensor units 111 disposed through the building area 102. FIG. 2 shows a schematic block diagram of the building system 100 of FIG. 1 apart from the building area 102.

Referring specifically to FIG. 1, the building area 102 includes a first space 112 in the form of an office, a second space 114 in the form of a conference room, and a third space 116 in the form of a hallway. The specifics of the layout of the building area 102 and spaces 112, 114 and 116 are given by way of example only for the purposes of exposition. Those of ordinary skill in the art may readily adapt the principles described herein to any number of building layouts.

The first space 112 includes a chair 142, walls 144-147, a computer workstation 148, a telephone set 150, a window 154 and a desk 156. A ventilation damper 158 is disposed above the ceiling space of the space 112, and is responsible for delivering conditioned air to the first space 112. The conditioned air may be chilled air or heated air, and includes both recirculated and fresh air. The ventilation damper 158 receives the conditioned air from air handling units and ventilation ducts, not shown, but which are known in the art. In general, the ventilation damper 158 may be used to control the temperature and/or fresh air content of the first space 112. To this end, a controller, not shown provides control output signals to the ventilation damper 158 to further open or close the damper 158 responsive to sensed conditions within the first space 112 and other factors.

The second space 114 includes fours chair 162-165, four walls 166-168, 147 (shared wall), a conference table 170, a side table 172, a desk lamp 174 and a window 176. A ventilation damper 178 is disposed above the ceiling space of the space 114. The ventilation damper 178 operates in substantially the same manner as the damper 158 of the first space 112. In particular, the ventilation damper 178 is configured to deliver controlled amounts of conditioned air to the second space 114.

The third space 116 includes three wall segments 146, 166 and 180, a photocopier device 182, and a ventilation damper 184. The ventilation damper 184 is disposed above the ceiling space or plenum of the space 116, and operates in substantially the same manner as the damper 158 of the first space 112. In particular, the ventilation damper 184 is configured to deliver controlled amounts of conditioned air to the third space 116.

Referring again generally to FIGS. 1 and 2, each passive wireless device 108x is affixed to or within an object within the building area 102. The object may be a fixture, such as on a wall, window, carpeting, structural beams, HVAC structures, overhead lighting, and electrical and plumbing fixtures. The object may be a furnishing, such as tables, lamps, chairs, desks, window treatments and the like. The object may be electrical in nature, such as photocopiers, printers, telephones, lamps and lights. Preferably, all of such objects have a passive wireless device 108x.

By way of example, the passive wireless devices 108a, 108b, 108c and 108d are disposed on the four walls 144, 145, 146 and 147 of the first space 112, the passive wireless devices 108e, 108f are disposed, respectively, on the chair 142 and desk 156 of the first space 112, the passive wireless devices 108g, 108h are disposed on the windows 154, 176 of the first and second spaces 112, 114, the passive wireless devices 108i, 108j are disposed respectively, the computer workstation 148 and telephone set 150 of the first space 112. Other passive wireless devices are disposed on like objects within the building area 102.

Each passive wireless device 108x contains first information regarding at least one property of the object to which it is affixed. In a preferred embodiment, each passive wireless device 108x includes information regarding a plurality of physical characteristics of the object to which it is attached. Such physical characteristics can include physical dimensions, thermal properties, manufacturer ID, object type ID, and date of manufacture, as well as subsets thereof. The physical characteristics can be specific to the type of object. For example, the stored physical characteristics of an electrical device such as the printer/copier 182, the computer 148 or telephone set 150 may include energy consumption information, and/or thermal energy (heat) generating properties. The stored physical characteristics of a window (e.g. 154, 176) may include optical properties and thermal properties.

Each of the passive wireless devices 108x is configured to communicate wirelessly to at least one of the wireless nodes 106 using power derived from communication signals detected in the passive wireless device 108x. Thus, for the example, the passive wireless devices 108x may suitably include so-called radio frequency identification (RFID) technology, which is known in the art. The passive wireless device 108x receives a signal from the wireless node 106 and transmits a response that includes stored data. The passive wireless device 108x harvests power from the received signal to perform the responsive transmission. Such technologies are generally known.

Figure 3:
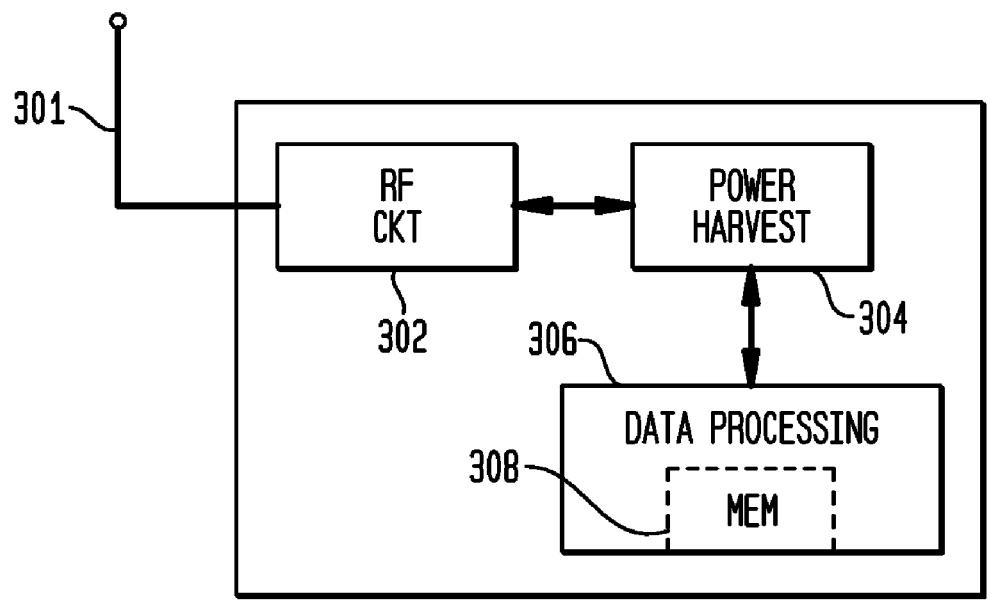
FIG. 3 shows a block schematic diagram of an exemplary embodiment of a passive wireless device that may be used in the building system of FIG. 1.

FIG. 3 shows a block schematic diagram of an exemplary embodiment of a passive wireless device 108x. The passive wireless device 108x includes an antenna 301, an RF circuit 302, a power harvest circuit 304, and a data processing circuit 306. The antenna 301 can take any suitable for form RF transmission and reception, and is operably connected to the RF circuit 302. The RF circuit 302 is an RF receiver and transmitter that is configured to operated on frequencies typically used for RFID operations. Multiple bands are currently in use for RFID operation. Devices operating in these frequency ranges are known. The power harvest circuit 304 is a circuit that is operably coupled to obtain energy from RF signals received by the RF circuit 302, and is configured to provide that energy as bias power for the data processing circuit 306 and the RF circuit 302. The data processing circuit 306 includes a memory 308 that stores information regarding the object to which the passive wireless device 108x is attached. Such information may include physical dimensions of the object, the identification of the object, the manufacturer of the object, thermal, optical and/or electrical properties of the object, and the date of manufacture of the object.

In some embodiments, the memory 308 can store information regarding the "carbon shadow" of the object. The carbon shadow is the "carbon footprint" of the object in relation to its manufacture, storage, delivery and installation into the building area 102. If the object is electrical in nature, its carbon footprint information may include information regarding the average power consumption of the object or other measure of its energy usage. Accordingly, it will be appreciated that the processing circuit 110 of FIG. 1 can be used to track the carbon footprint of the building based on the information stored in the passive wireless devices 108x.

Referring again the passive wireless device 108x in general, it will be appreciated that the passive wireless device 108x can be a so-called battery-assisted passive RFID device wherein a battery is included for powering the data processing circuit 306. In such a device, the energy from received RF signals is still used for transmission of responsive signals via the RF circuit 302.

Referring again to FIGS. 1 and 2, the sensor units 111 include sensors for various conditions monitored and/or controlled by building systems. For example, the sensor units 111 can include temperature sensors, air flow sensors, light sensors, volatile organic compound sensors, or the like. In one embodiment, each of the sensor units 111 is a wireless sensor unit that includes multiple sensors, including microelecromechanical systems (MEMS) sensors. The sensor units 111 preferably comprise the sensors used for normal building automation operations such as, for example, temperature and ventilation control.

Figure 4:
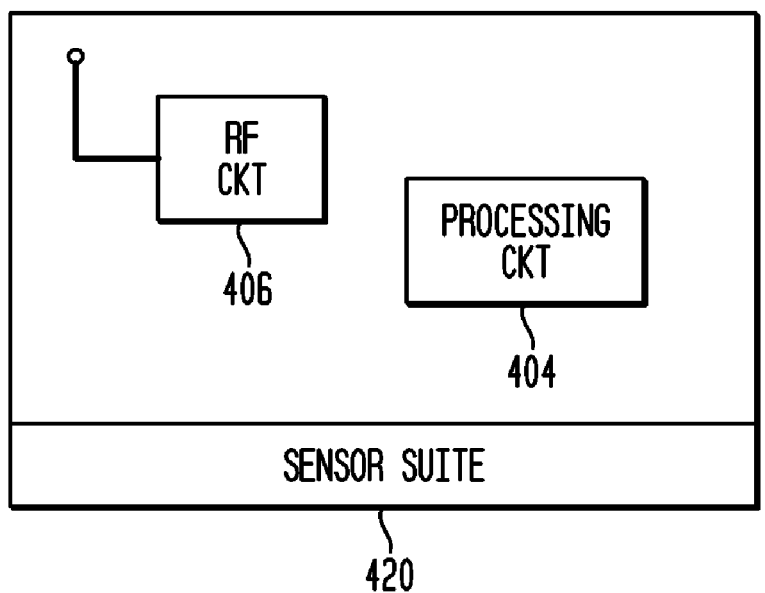
FIG. 4 shows a block schematic diagram of an exemplary embodiment of a sensor unit that may be used in the building system of FIG. 1.

FIG. 4 shows an exemplary configuration of a multi-purpose sensor unit 400 that may be used as one or more of the sensor units 111. The sensor unit 400 is a microsystem that employs a suite of MEMS sensors 402 that can any measure any combination of temperature, air flow, humidity, light, $CO_2$, volatile organic compounds (VOCs). The microsystem sensor unit 400 may also incorporate processing circuitry 404, as well as radio frequency transmission circuitry 406. General examples of MEMS devices having processing circuitry and RF capability are discussed in U.S. patent application Ser. No. 10/353,142 entitled "Building System with Reduced Wiring Requirements and Apparatus for Use Therein", filed Jan. 28, 2003, and U.S. patent application Ser. No. 10/672,527, filed Sep. 26, 2003, entitled "Building Control System Using Integrated MEMS Device", both of which are incorporated herein by reference. Other devices of this nature are also known.

Referring again to FIG. 1, the wireless nodes 106 are disposed throughout the building area 102. As illustrated in FIG. 2, the wireless nodes 106 are configured to communicate wirelessly with the sensor units 111 and the passive wireless devices 108x. The wireless nodes 106 are preferably also configured to communicate with the processing circuit 110 via a communication network 104 that extends substantially throughout the building area 102. The communication network 104 may suitably comprise an Ethernet-based network, a wireless LAN (WLAN), or a combination of both.

Figure 5:
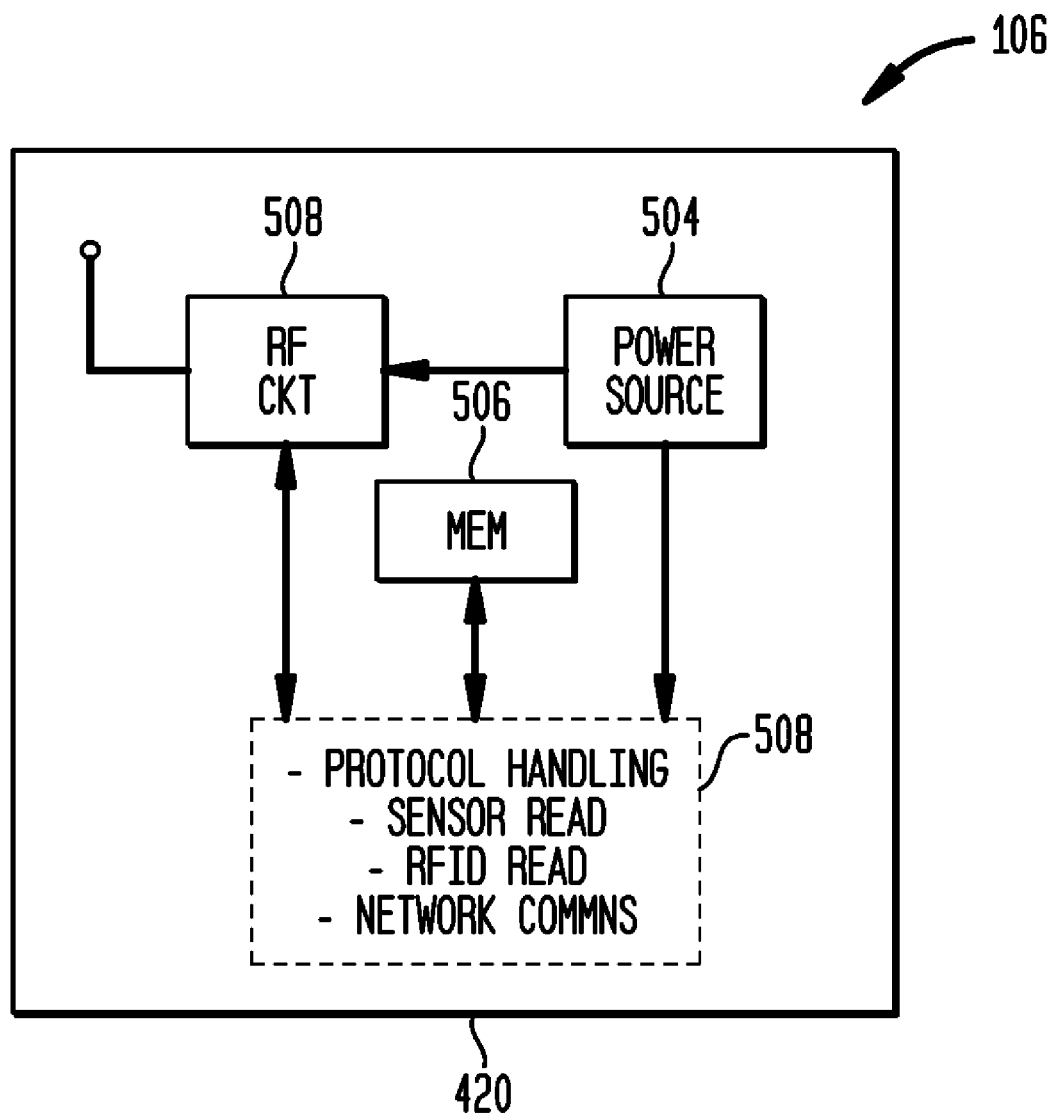
FIG. 5 shows a block schematic diagram of an exemplary embodiment of a wireless node that may be used in the building system of FIG. 1.

FIG. 5 shows an exemplary embodiment of a wireless node 106 that is configured for use with a communication network 104 in the form of a WLAN. However, it will be appreciated that other embodiments of the wireless node 106 would be configured to communicate via a network cable, and thus are only "wireless" in the sense that such nodes communicate with sensor units 111 and passive wireless devices 108x in a wireless manner. Referring to the embodiment of FIG. 5, the wireless node 106 includes an RF communication circuit 502, a power source 504, a memory 506 and a processing circuit 508.

In the embodiment described herein, the RF communication circuit 502 includes an RF transmitter and receiver that is configured to controllably transmit and receive RF signals in the frequencies employed by the communication network 104, the sensor units 106, and the passive wireless devices 108x. Thus, for example, the RF transceiver circuit 502 is capable of transmitting and receiving wireless local area networks (WLANs), RFID tag signals, and Bluetooth signals. The RF communication circuit 502 is further configured to demodulate the RF signals based on the one of the three wireless communication schemes being employed by the communication network 104, the sensor units 106, and the passive wireless devices 108x.

The power source 504 is a source of electrical power for use by the communication circuit 502, the memory 506 and the processing circuit 508. The power source 504 may suitably include a long life lithium cell, or the like. However, in an embodiment wherein the wireless node 106 connects physically to the communication network 104, electrical power may also be derived from such a connection or another connection.

In any event, the processing circuit 508 includes circuitry for processing data transmitted using the three communication schemes employed by the communication network 104, the wireless sensor units 111, and the passive wireless devices 108x. Accordingly, the processing circuit 508 includes logic for protocol handling, as well as data formatting, for data received from the sensors 111, the passive wireless devices 108x, and the communication network 104. The processing circuit 508 further includes logic for controlling the operation of the RF communication circuit 502.

In addition, the processing circuit 508 is further programmed to carry out the operations (or to cause the elements 502 and 504 to carry out operations) attributed to the wireless node 106 as described herein. To this end, the processing circuit 508 carries out operations stored as software code, which may be stored all or in part in the memory 506. The memory 506 preferably also contains a list, table or data base that identifies the wireless passive devices 108x that have been previously detected by the wireless node 106. Such data enables the wireless node 106 to discover new passive wireless devices 108x, or detected when a passive wireless device 108x has been removed.

It will be appreciated that the functionality of the wireless node 106 and the sensor unit 111 can be combined into one device, at least in some circumstances. In addition, it is noted the wireless node 106 could include controller functionality for an automation system, such as a controller for a ventilation damper, water valve, lighting fixture, or the like.

Referring again to FIGS. 1 and 2, the processing circuit 110 in this embodiment is part of a computer workstation 130 that includes a user interface 132, and a communication circuit 134. The processing circuit 110 is also connected data storage 136, which may or may not be all or partially included at the workstation 130. The data storage 136 stores, among other things, a building data model 137, or building model 137, which can be generated or updated as described herein.

The building data model 137 is a database or other collection of data files the models the structures and operations of a building. The general architecture of such models is known, and typically include for each object in the model, its attributes and an identification of other objects in the model that it interacts with, or is connected to. In the embodiments described herein, the model 137 differs from known building models by containing far more granular information about the building, including objects resulting from use of the building (such as furniture, equipment, and even occupancy), and the manner in which the model 137 is updated and used. Other differences will become readily apparent through the description.

In general, the processing circuit 110 is operably coupled via the communication circuit 134 and network 104 to receive the information regarding the wireless devices 108x from the wireless nodes 106. The processing circuit 110 is configured to update (or even generate) the building model 137 based at least in part on the information stored in the passive wireless devices 118. In a simplified example, the processing circuit 110 can be used to enhance the building model 137 stored in the data store 136 by incorporating thermal properties obtained from passive wireless devices 108g, 108h affixed to windows 154, 176 in the building area 102. Such information can be used by simulation programs or planning programs that develop heating, cooling and ventilation strategies. Likewise, the processing circuit 110 may enhance the building model 137 by incorporating thermal (heat generating) properties obtained from the passive wireless devices 108i, 108j, affixed to electrical devices, such as the computer workstation 148 and the telephone set 150.

The processing circuit 110 is further configured to obtain information regarding the building conditions from the sensor units 111. Such information may be used for developing control strategies, adjusting real-time control operations, or providing a visualization (display) of the present conditions (or trends) within the building area 102.

The processing circuit 110 further employs the user interface 132 to display information regarding the model 137 and/or sensed conditions in the building 102. Because the processing circuit 110 has access to an accurate model 137 and to sensor values from the sensors 111, the processing circuit can provide intuitive displays of building layouts with information regarding the conditions sensed therein. Because the sensor units 111 in some embodiments are capable of sensing multiple environmental conditions, the processing circuit 110 can contemporaneously display information showing multiple conditions in a space within a displayed floor plan of the space, including objects located therein, if desired.

The above described combination of wireless nodes 106, passive wireless devices 108x and processing circuit 110 can provide multiple enhancements or improvements to building data models. In some embodiments, the wireless nodes 106 and passive wireless devices 108x can be used to help identify the location of new objects moved into a space, or a changed location of an existing object, thereby allowing for update of the building model 137. For example, if the wall 147 between the spaces 112 and 114 is moved two feet to the left, then the wireless nodes 106 can detect the movement through performing a location operation to determine the location of the passive wireless device 108d.

Figure 6:
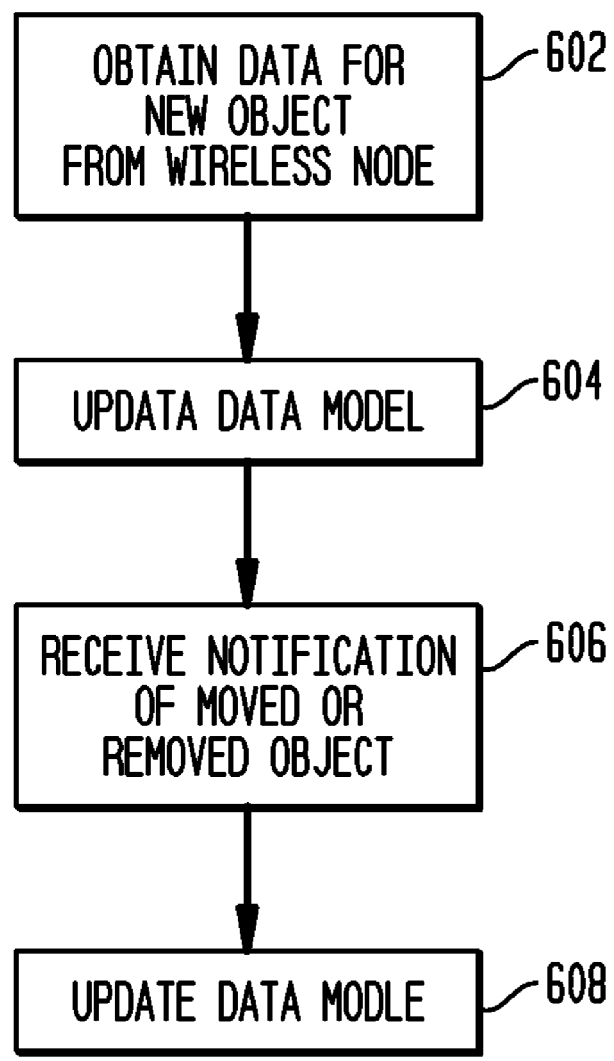
FIG. 6 shows a first set of operations that may be carried out in by the system of FIG. 1 according to an embodiment of the present invention.

To this end, FIG. 6 shows a first set of operations that may be carried out in by the system 100 according to the present invention. FIG. 6 shows operations used by the system 100 to generate updates to a building model.

In step 602, the processing circuit 110 obtains new data for the building model 137 stored in the data store 136 based on information generated using the passive wireless devices 108x. The information includes the identification and location of an object newly disposed at a location within the building area 102. In addition, the information may include obtaining other characteristics of the object from its passive wireless device, such as physical characteristics, carbon footprint information, and the like.

Figure 7:
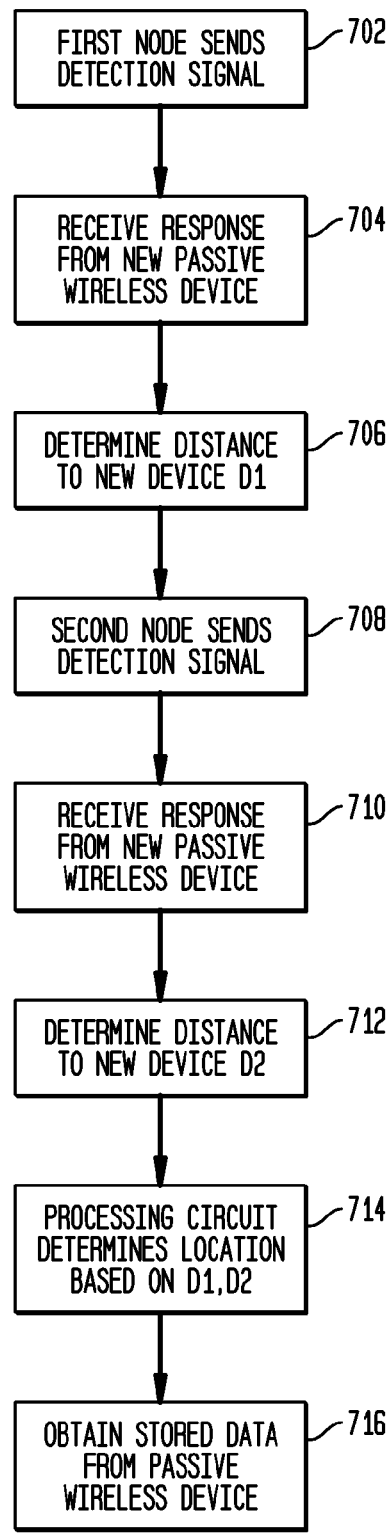
FIG. 7 shows an exemplary set of operations that may be used by the wireless nodes and the passive wireless device obtain location, identification and other characteristics of a newly located object within a building space.

FIG. 7 shows an exemplary set of operations that may be used by the wireless nodes 106 and the passive wireless device 108x to obtain location, identification and other characteristics of a newly located object within the building area 102.

In step 702, a first wireless node 106 sends probe RF signal to discover any passive wireless objects not previously detected. Such signals are intended to generate a substantially instantaneous response from passive wireless devices. In step 704, the first wireless node 106 receives a response signal from a passive wireless device 108x that has not been previously detected by the first wireless node 106. In step 706, the first wireless node 106 determines a distance d1 to the passive wireless device 108x, based on the time differential between transmission (step 702) and receipt of the response (step 704). Alternatively, the first wireless node 106 may transmit a separate ranging signal to the new RFID device and determine the distance d1 based on the time differential between transmission of the ranging signal and receipt of the response from the new RFID device.

In step 708, a second wireless node 106 also sends probe RF signal to discover any passive wireless objects not previously detected. In step 710, the second wireless node 106 receives a response signal from the new passive wireless device 108x. To this end, it is noted that substantially every location within the building area 102 is preferably within the wireless communication range of at least two wireless nodes 106. Accordingly, the placement of an object anywhere within the building area 102 results in at least two wireless nodes being able to detect the object's passive wireless device 108x. In step 712, the first wireless node 106 determines a distance d2 to the passive wireless device 108x, based on the time differential between transmission (step 708) and receipt of the response (step 710).

In step 714, a processing circuit determines the location of the new passive wireless device 108x based on d1, d2, the locations of the first and second wireless nodes 106, and other information. The other information may be another distance d3 to another wireless node 106, obtained in the same manner as d1 and d2. The additional distance value d3 enables location via triangulation calculation. Alternatively, the other information can be information regarding the layout of the building area. For example, for any two wireless nodes 106 in FIG. 1 having determined distances d1, d2 to an unknown object, the intersection of d1, d2 will only define two points in a two-dimensional coordinate scheme. However, one of those two points will not be within the area 102. Accordingly, the processing circuit can determine in step 712 the absolute location of a point, based on the two distances d1 and d2 from known locations of the wireless sensors, in a two-dimensional coordinate scheme. Such information is often sufficient even for three-dimensional coordinate schemes for objects that can safely be assumed to be located on the floor, such as tables, chairs, and large photocopiers. Otherwise, approximations are sufficient.

The processing circuit that carries out step 714 may suitably be the processing circuit 110. However, it will be appreciated that the processing circuit 508 of the one of the wireless nodes 106 may also carry this calculation, as well as other processing circuits.

In step 716, the first (or second) wireless node obtains any physical characteristic information regarding the object based on the information stored in the memory of the passive wireless device 108x. While such information can be obtained in step 702 or 708, obtaining extensive information in those steps could interfere with the ability to obtain a proper distance measurement because there can be a delay introduced by retrieving information from the memory 308 of the passive wireless device 108x. Thus, obtaining stored information in a separate step allows for a simplified distance measurement probe signal in steps 702 and 708.

It will be noted that other methods of identifying newly located passive wireless devices, determining their location, and obtaining the information about the object on which the passive wireless device is attached may be employed using the wireless nodes 106. To this end, U.S. patent application Ser. No. 11/206,523, filed Aug. 17, 2005, to Fabrizio Stortoni, describes a method in which location coordinates and information content of RFID tags in a building environment may be obtained. The disclosure of U.S. patent application Ser. No. 11/206,523, filed Aug. 17, 2005, is incorporated herein by reference.

Referring again to FIG. 6, after step 602, the processing circuit 110 performs step 604. In step 604, the processing circuit 110 updates the building model 137. For example, if the object is a new object in the building area 102, such as new furniture, or a new compute workstation, the processing circuit 110 may first add the object to the building model file, and then link the object to the model 137 based on the location information and/or other information. The processing circuit 110 may also add other logical links, such as the logical position of the object in a system, such as an HVAC or fire system, if applicable. Methods of adding new elements to an existing building model using the object ID, the object location, and preferably physical dimensions are known. Properties such as thermal properties, age, electrical properties and the like may be added if they are 1) supported by the model 137 and 2) provided by the passive wireless sensor 108x.

In step 606, the processing circuit 110 receives any information regarding objects within the building model 137 that have been moved within, or removed from, the area 102. To this end, the various wireless nodes 106 are configured to periodically check to see if objects previously detected by the nodes 106 are still detectable. Location of previously detected objects may be re-verified using a process similar to that described above in connection with FIG. 7. If the nodes 106 (and processing circuit 110) detect that an object device that is currently in the building model 137 has been moved within the area 102 or completely removed, then the nodes 106 notify the processing circuit 110. In step 606, the processing circuit 110 receives the notification. In step 608, the processing circuit 110 updates the building model 137 accordingly.

Steps 602, 604, 606 and 608 can be repeated until all new, newly moved, or removed devices have been processed to update the model 137. Accordingly, system 100 of FIG. 1 provides a method in which a building model stored in a data store can be updated in an ongoing manner. This process can be used during phases of commissioning the building as well as during day to day operation of the building. Thus, the building model can be kept current without requiring significant amounts of manual data entry. Thus, in contrast to prior practices, the system 100 maintains a building model during ongoing operation of the building, long after the initial construction and commissioning of the building have been completed.

It is further known that the presence of occupants can affect building behavior. Accordingly, in some embodiments of the system 100, the processing circuit 110 is further configured to update the building model 137 with a representation of occupants within a building. The building model 137 would thus include information regarding occupants and their location within the building area 100.

To this end, the system 100 of FIG. 1 may be enhanced to incorporate passive wireless devices 108x disposed on the occupants of a building. For example, each person within a building may be required to wear an identification (or other security) badge. Such a badge would include an RFID device (passive wireless device 108x). The system 100 may then use operations similar to those discussed above in connection with FIGS. 6 and 7 to identify the presence and location of occupants within the building. The model 137 may be updated to include a quasi-real time representation of the current occupancy of a building. In the alternative, or in addition, the system 100 can use operations similar to those of FIGS. 6 and 7 to track or trend occupancy on an hourly, daily, weekly and/or seasonal basis. Using the locating operations of FIG. 7, the occupancy may be trended on a room-by-room basis. Such information may be incorporated into the building model 137, or stored as a related database.

The system 100 described above enhances intelligent building control by combining the ongoing, updated model 137 with building operation data, as well as occupancy trends. As discussed above, updated building models can assist in improved building control strategies.

Figure 8:
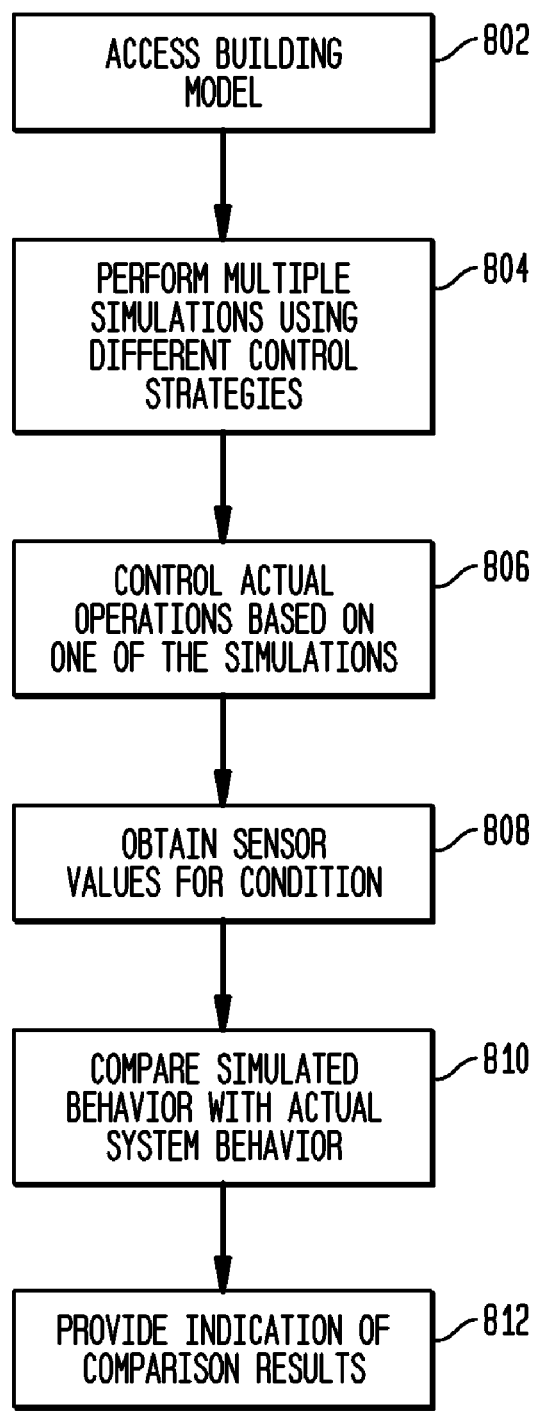
FIG. 8 shows an exemplary set of operations for simulating control strategies using a building model generated at least in part using the system of FIG. 1.

For example, the operations of FIG. 8 show how the system 100 may be used to determine HVAC control strategies using simulation. In contrast to prior HVAC simulation techniques, the present invention features generating simulations using a building model 137 with current and accurate thermal modeling information. In addition, the system 100 can evaluate the accuracy of one or more simulations by using the sensor units 111 to detect the actual conditions of the system when a simulated control strategy is actually carried out. In addition, in contrast to prior art simulations, the thermal behavior of the occupants may also be incorporated into the simulation using the stored occupancy trend data.

Referring to FIG. 8, in step 802, the processing circuit 110 (or another processing circuit) obtains access to the building model 137 that has been updated as described above. Such a model provides an accurate representation of all, or nearly all, objects within the building. In addition, optionally, the building model 137 can include (or separately access) an occupancy model for each space 112, 114 and 116 of the building. As discussed above, such an occupancy model may be obtained by detecting occupants in real-time with the spaces 112, 114 and 116, and accumulating occupancy data over time.

In step 804, the processing circuit causes multiple simulations to be performed. Each of the simulations can specify conditions such as outdoor weather, the time of day, and the control strategy. In one embodiment, multiple simulations are performed by varying the control strategy, but using constant weather conditions. Various simulation methods are known. These known simulation methods use the building model 137 to efficiently predict system behavior in response to a particular set of control operations. Because the model 137 as described herein can include thermal properties of various objects, such as electrical devices, windows, and can estimate the thermal contribution of occupants based on the occupancy trends, the simulation can be more comprehensive and accurate then previous simulation methods.

In step 806, the processing circuit 110 can cause the HVAC system to perform control operations in accordance with a select one of the simulations. To this end, analysis of the simulations may indicate a control strategy that is particularly efficient for a given set of circumstances (weather, time of day, season). The processing circuit 110 in step 806 causes that control strategy to be implemented by the HVAC system. To this end, the processing circuit 110 can communicate control strategy information to and HVAC control station, not shown, or directly to controllers, not shown, that control the ventilation dampers 158, 178 and 184. In some embodiments, it is contemplated that the processing circuit 110 and workstation 130 also comprise a control station of one or more building automation systems.

In step 808, the processing circuit 110 obtains values for sensor units 111 that identify the conditions in the building area 102 after the control strategy has been implemented. To this end, the sensor units 111 communicate information regarding sensed conditions (temperature, humidity, $CO_2$, VOCs, and/or flow) to the processing circuit 110 via the wireless nodes 106 and the network 112.

In step 810, the processing circuit 110 compares the actual behavior of the system, based on the sensor information obtained in step 808, to the simulated behavior predicted in step 804. As discussed above, the simulation can be granular, providing simulated behavior with respect to temperature and other conditions for each space 112, 114 and 116. Because the spaces 112, 114 and 116 have individual sensor units 111, the processing circuit 110 also has granular sensor data. Thus, the comparison in step 810 can include a space by space analysis of the differences between the simulated behavior and the actual behavior.

In step 812, the processing circuit 110 provides a visual indication of the results of the comparison, and at a minimum, and indication of where the simulation and the actual conditions varied significantly. A technician receiving such an indication may then determine the cause of the variance. A variance between a simulated behavior of an HVAC system and the actual behavior can be the result of errors in the building model 137. Alternatively, a variance can indicate an equipment malfunction, or even equipment or structural components in need of maintenance. Accordingly, by displaying or otherwise indicating the existence and location of a significant variance between a simulated system performance and an actual system performance, maintenance issues in the building system can be discovered and corrected in a timely manner to help the system behave more efficiently.

In another operation that does not necessarily involve simulation, the processing circuit 110 uses accumulated sensor values from the sensors 111 to develop granular trends of various sensed conditions in the spaces 112, 114 and 116. The processing circuit 110 is further configured to correlate the sensed condition trends with occupancy trends within each space 112, 114, and 116. The processing circuit 110 can then cause graphical or textual display of the result of the correlation.

In this manner, problems that manifest themselves in spaces during high occupancy times can be addressed. For example, the processing circuit 110 may identify a correlation in VOCs during high usage times of the conference room space 114. The processing circuit 110 displays such a correlation. With the information made known, investigative and/or corrective action may be taken.

Similarly, the processing circuit 110 may employ the same methods to correlate sensed environmental conditions with characteristics of objects in the building based on the information in the model 137. For example, the processing circuit 110 is configured to determine correlations between particular environmental conditions sensed by the sensor units 111 and physical characteristics of objects in a space as stored in the model 137. For, example, the processing circuit 110 may identify a correlation between a certain manufacture of carpet (from the model 137) and excessive VOCs (as sensed by sensor units 111), or excessive heat in areas that include a certain model of photocopier. The processing circuit 110 provides a display of such correlations so that further analysis, investigation, and/or corrective action can be taken.

Figure 9:
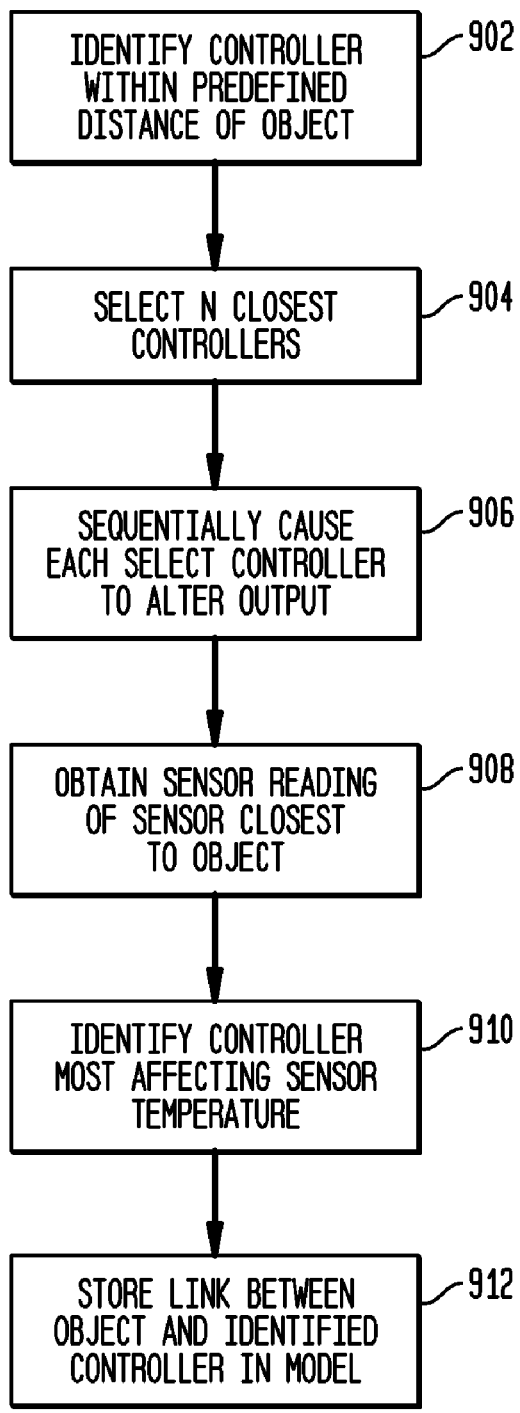
FIG. 9 shows a second set of operations that may be carried out in by the system of FIG. 1 according to an embodiment of the present invention.

FIG. 9 shows a different set of operations that may be carried out using the structures of the system 100. In particular, one of the issues in the installation and maintenance of a building HVAC system is tracking how ventilation dampers (or other actuators) are controlled. In particular, a ventilation damper (e.g. dampers 158, 178 and 184) typically receive control signals from a field controller or field panel, such as a Siemens model TEC controller. The field controllers typically located near, but not necessarily in the same room as, the ventilation damper it controllers.

When a damper is installed or replaced within a building, the methods of FIGS. 6 and 7 can be used to identify the physical location and other properties of a newly installed damper. However, the methods of FIGS. 6 and 7 cannot necessarily be used to identify which controller is responsible for controlling the operation of the ventilation damper, as that is an installation issue. It is not likely that an installation technician would have the responsibility or capability of updating a passive wireless device 108x on a damper to indicate how it is connected to the HVAC system. Thus, the processing circuit 110 can identify and locate the new damper, but cannot "connect" the damper to a field controller within the building model 137.

Figure 10:
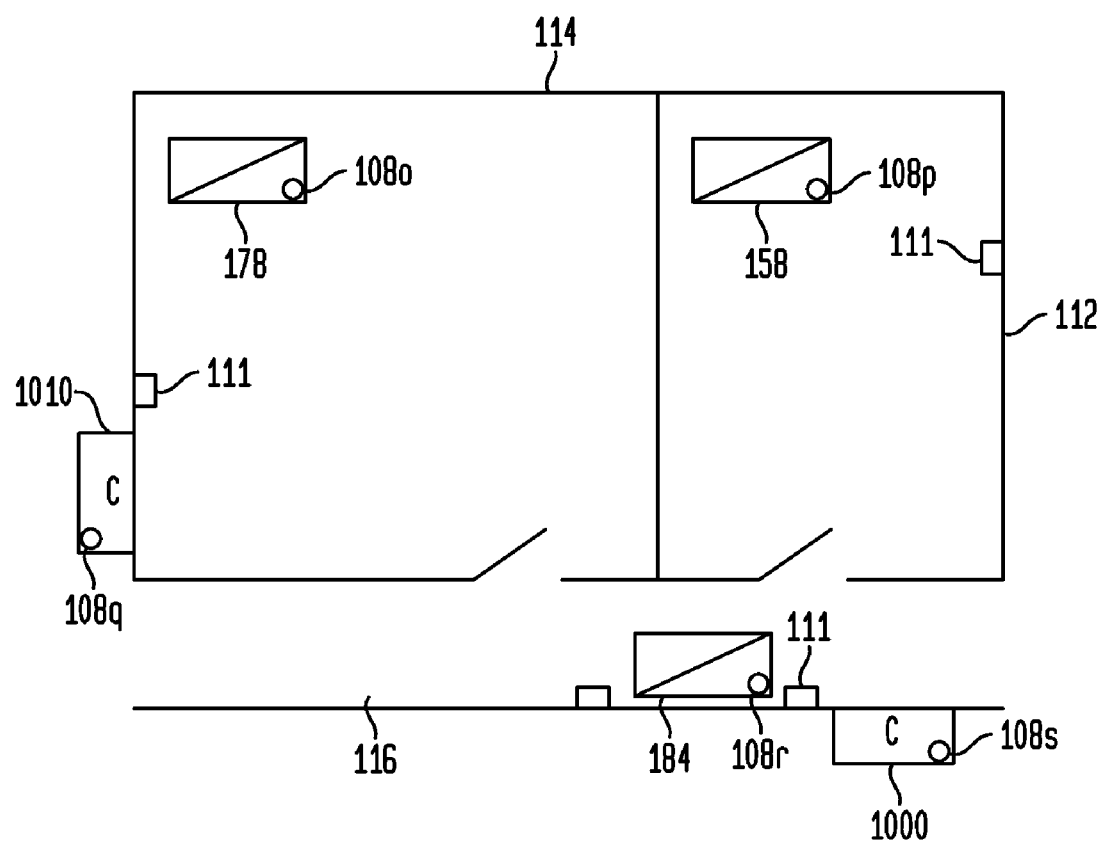
FIG. 10 shows an exemplary layout of controllers, ventilation dampers and sensors in the building area shown FIG. 1.

For example, a large open area in an office complex may include multiple zones having multiple dampers and two or more field controllers. FIG. 10 shows a situation in which the three dampers 158, 178 and 184 are possibly controlled by two controllers 1008 and 1010. While the individuals that installed the dampers 158, 178 and 184 would likely know which controllers specifically control each of the dampers, such information is not stored on their respective passive wireless devices 108x, and thus is not readily available for updating the building model 137. Even if the HVAC system has very clear identification of the controller that controls each damper, the physical location of such controller may not stored in a format readily usable by a building model.

The operations of FIG. 9 are employed to help determine which controller (as identified in the building model 137) controls a particular damper within the system 100. For example, consider an example in which the processing circuit 110 attempts to determine the controller that controls the damper 158.

In step 902, the processing circuit identifies a plurality of controllers, e.g. controllers 1008, 1010 that are within a predefined distance to the damper in question, e.g. damper 158. The processing circuit 110 identifies these controllers using the location information for the controllers and the damper 158. The location may suitably be obtained from the building model 137, generated as described herein. For example, the locations of the dampers 158, 178 and 184 and the controllers 1008, 1010 would have been determined using the operations of FIG. 7.

In step 904, the processing circuit 110 identifies the N controllers that are closest to the damper, e.g. damper 1004. The number N may suitably be four. In the example described herein, only two controllers 1008 and 1010 are candidates, and therefore step 904 is not necessary. However, in the event that many controllers are within the "predefined" distance of a controller in question, the processing circuit 110 limits the candidate controllers to the closest N controllers.

The processing circuit 110 then, in step 906, sequentially causes each of the selected N controllers to change the flow of chilled air (or heated air) in a defined manner. As a result, each controller generates an output signal that causes its attached damper or dampers to open or close, thereby allow more or less condition air.

Such an operation is intended to alter the temperature in the particular space in which the damper 158 is located. If a particular controller controls the damper 158, then the more or less chilled (or heated) air would be admitted to the space as a result of the changed output signal. If, however, a particular controller does not control the damper 158, then the temperature near the damper 158 will not be affect much, if at all.

In step 908, the processing circuit 110 obtains sensor measurements from the sensor unit 111 closest to the damper in question, i.e. damper 158. The processing circuit 110 records the sensor output corresponding to the times when each of the select controllers altered its respective output flow signal to its connected dampers. As discussed above, if a candidate controller is configured to control the damper 158, then a significant temperature change will be detected. However, if a candidate controller is configured to control some other damper, then the measured temperature near the damper 158 will not be effected.

In step 910, the processing circuit 110 identifies the controller that most affected the temperature in the vicinity of the damper 158. In step 912, the processing circuit 110 stores in the building model 137 a link between the damper 158 and the identified controller.

It will be appreciated that the above described embodiments are merely exemplary, and that those of ordinary skill in the art may readily devise their own implementations and modifications that incorporate the principles of the invention and fall within the spirit and scope thereof.

We claim:

1. A building system, comprising:
 a) a communication network;
 b) a plurality of wireless nodes within a building operably coupled to the communication network;
 c) a plurality of passive wireless devices, each passive wireless device affixed to or within an object within the building, each passive wireless device containing first information regarding at least one property of the object, each of the passive wireless devices configured to communicate wirelessly to at least one of the wireless nodes using power derived from communication signals detected in the passive wireless device;
 d) a plurality of sensors configured to generate second information representative of sensed temperature throughout the building, each sensor operably connected to the communication network;
 e) a processing circuit operably coupled to receive the first information from the wireless devices and the second information from the sensors, the processing circuit configured to generate control information regarding the building based on the first information and the second information.

2. The building system of claim 1, wherein the processing circuit is further configured to generate a model based in part upon the first information, and to generate control information based on the model and the second information.

3. The building system of claim 2, wherein the building system includes a plurality of controllers, and wherein the control information includes one or more set points for at least some of the controllers.

4. The building system of claim 2, wherein at least some of the plurality of sensors are disposed within one or more of the plurality of wireless nodes.

5. The building system of claim 1, wherein the processing circuit is further configured to generate a model based in part upon the first information and the second information, to generate a plurality of simulated control strategies based upon the thermal model, and to generate control information based on one of the plurality of simulated control strategies.

6. The building system of claim 1, wherein each passive wireless device includes:
 an RF circuit;
 a processing circuit operably coupled to the RF circuit;
 a power harvest circuit, wherein the power harvest circuit is configured to obtain energy from RF signals received by the RF circuit and provide the obtained energy as bias power for the processing circuit.

7. The building system of claim 6, wherein the processing circuit includes a memory, and wherein the memory includes information identifying physical characteristics regarding the object.

8. The building system of claim 7, wherein the memory further includes identification information regarding the object.

9. The building system of claim 7, wherein the processing circuit is configured to cause the RF circuit to transmit the information identifying physical characteristics regarding the object to the wireless node.

10. The building system of claim 7, wherein the memory of at least one passive wireless device includes information identifying at least one physical dimension of the object.

11. The building system of claim 7, wherein the memory of at least one passive wireless device includes information identifying at least one of the group consisting of a thermal property of the object and an optical property of the object.

12. The building system of claim 1, wherein the first information includes information identifying physical characteristics regarding the object.

13. The building system of claim 12, wherein first information includes information identifying at least one physical dimension of the object.

14. The building system of claim 12, wherein first information includes information identifying at least one of the group consisting of a thermal property of the object and an optical property of the object.

15. The building system of claim 1, wherein each passive wireless device includes:
 an RF circuit;
 a power harvest circuit, wherein the power harvest circuit is configured to obtain energy from RF signals received by the RF circuit and provide the obtained energy as bias power for the RF circuit.

16. The building system of claim 15, wherein the first information includes information identifying static physical characteristics regarding the object.

17. The building system of claim 16, wherein first information includes information identifying at least one physical dimension of the object.

18. The building system of claim 16, wherein first information includes information identifying at least one of the group consisting of a thermal property of the object and an optical property of the object.

* * * * *